Nov. 14, 1961  G. A. LYON  3,008,440
METHOD OF MAKING WHEEL COVERS
Filed Jan. 24, 1957  4 Sheets-Sheet 1
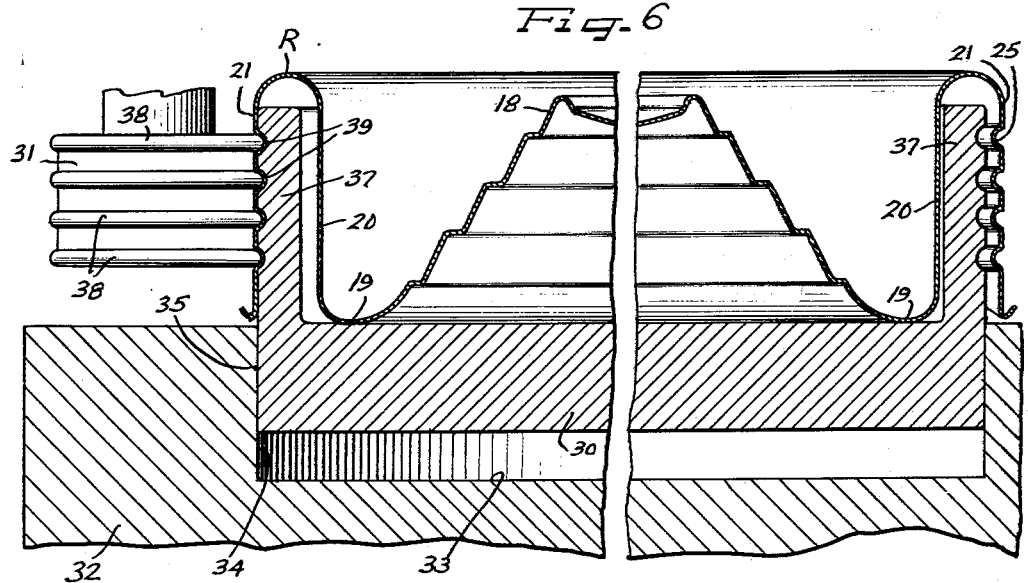
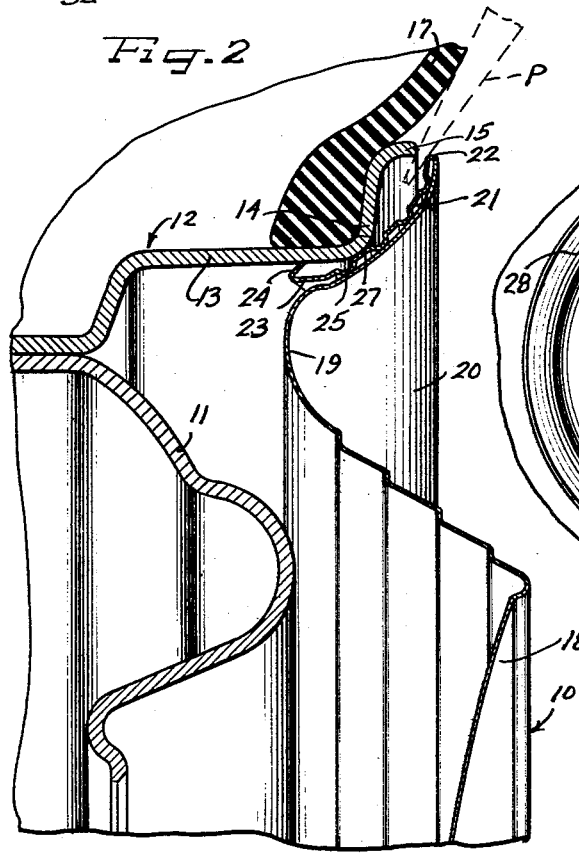
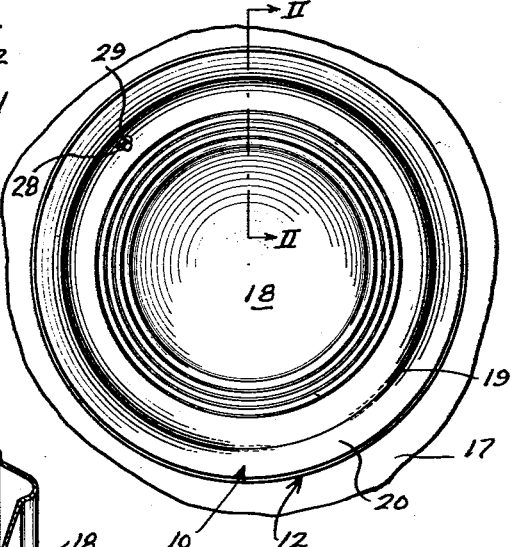
Inventor
GEORGE ALBERT LYON Nov. 14, 1961  G. A. LYON  3,008,440
METHOD OF MAKING WHEEL COVERS
Filed Jan. 24, 1957  4 Sheets-Sheet 2

Inventor
GEORGE ALBERT LYON
by Hill, Sherman, Meroni, Gross & Simpson Attys.

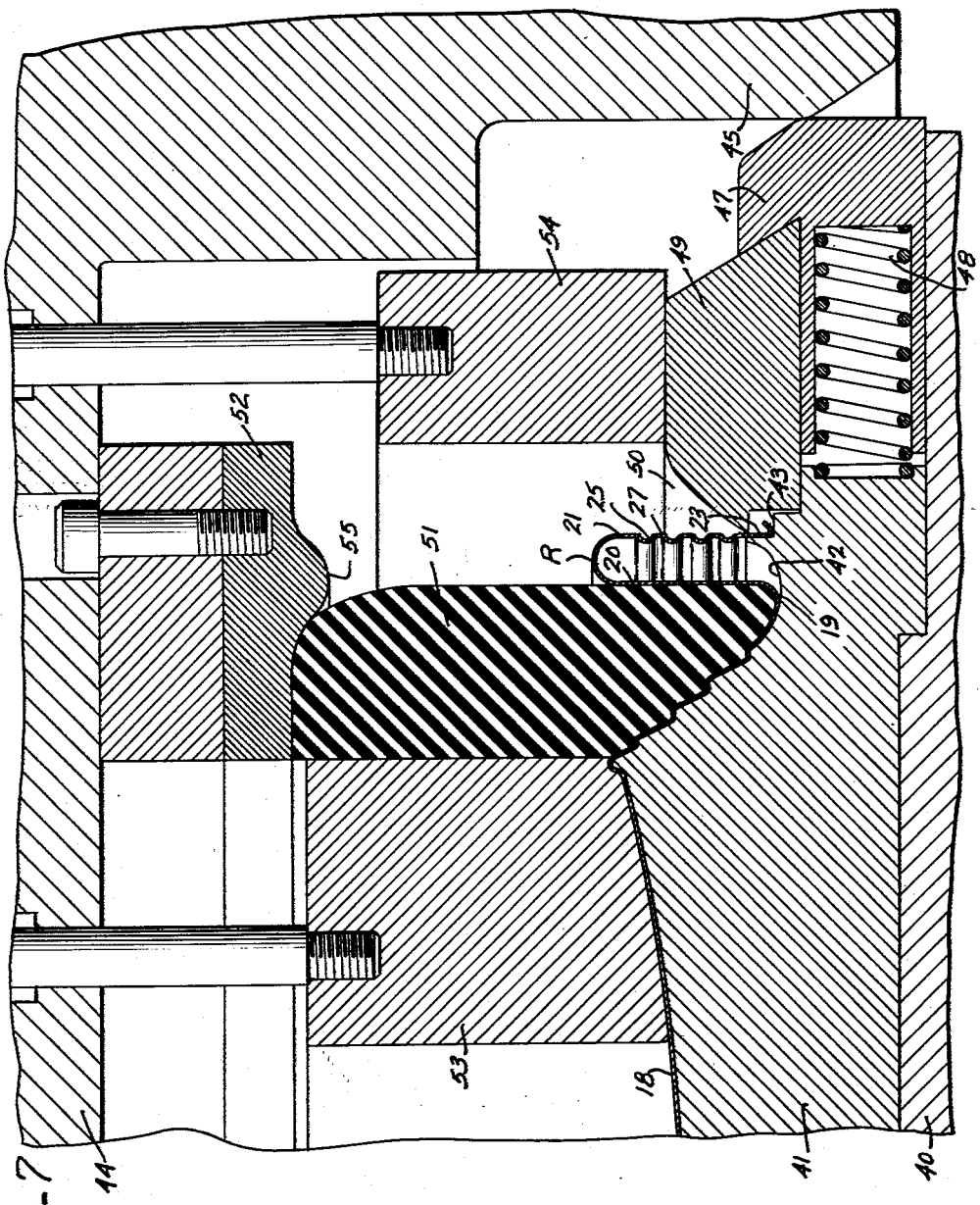

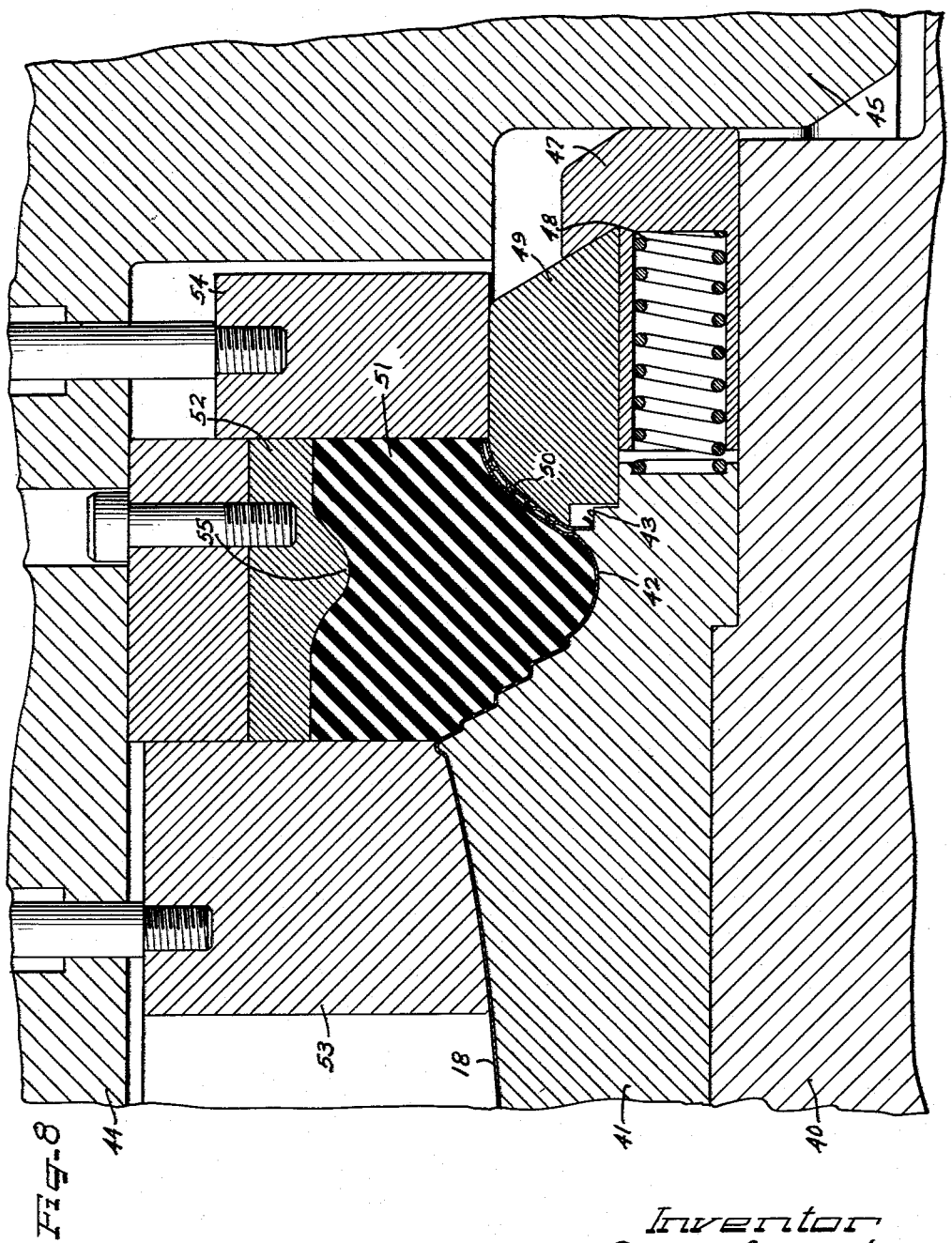

United States Patent Office 3,008,440
Patented Nov. 14, 1961

3,008,440
METHOD OF MAKING WHEEL COVERS
George Albert Lyon, 13881 W. Chicago Blvd.,
Detroit 28, Mich.
Filed Jan. 24, 1957, Ser. No. 636,158
3 Claims. (Cl. 113—116)

The present invention relates to automobile wheel covers, more particularly of the self-retaining type, and the making of such wheels covers.

An object of the invention is to provide a novel method of making wheel covers according to which an underturned marginal flange of the covers is provided with a plurality of multi-purpose ribs and grooves.

According to the general features of the present invention, I have provided a method of making wheel covers including the shaping of a sheet metal blank into a cover form having a large axially outwardly extending circular rib providing a groove of substantial width opening axially inwardly, with the radially outer side of the rib provided by an axially inwardly extending flange in spaced opposition to a radially inner generally axially extending cover portion and having cover retaining terminal means thereon. working said flange between opposed dies one of which is inserted within said groove and thereby shaping reinforcing ribs or corrugations in said flange in the portion thereof which opposes said radially inner generally axially extending cover portion, and thereafter collapsing said rib and bending said radially inner cover portion onto said reinforcing ribs or corrugations and over all but an axially inner portion of said flange and extending the collapsed flange and radially inner cover portion and said reinforcing ribs or corrugations into cover edge diameter-increasing and concealing relation overlying said terminal means.

Other objects, features and advantages of the present invention will be readily apparent from the following detailed description of a preferred embodiment thereof taken in conjunction with the accompanying drawings in which:

FIGURE 1 is an outer side elevational view of a wheel structure embodying features of the invention;

FIGURE 2 is a fragmentary enlarged radial sectional detail view taken substantially on the line II—II of FIGURE 1;

FIGURE 6 is a fragmental diametrical sectional detail view through forming apparatus by which the outer marginal flange leg of the cover blank is provided with reinforcing and pry-off shoulder ribs and grooves;

FIGURE 7 is a fragmentary vertical radial sectional detail view through forming apparatus by which the outer marginal upstanding large rib formation of the cover blank is adapted to be collapsed and worked into the ultimate diameter of the cover; and FIGURE 8 is a sectional view similar to FIGURE 7 but showing the apparatus at the completion of the forming stroke thereof.

Figure 3:
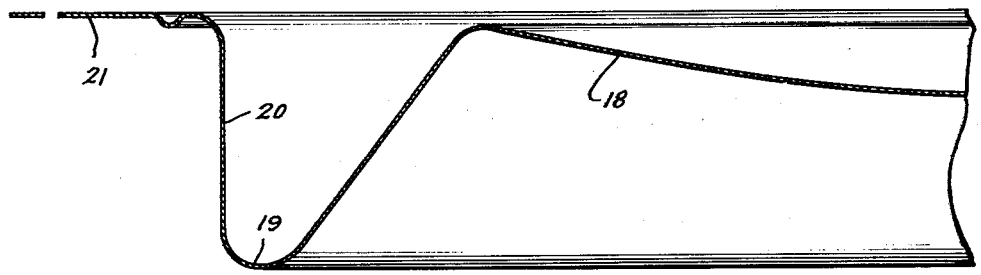
FIGURE 3 is a fragmentary radial sectional detail view through a partially formed cover blank.

A wheel cover 10 is constructed and arranged to be applied to the outer side of a vehicle wheel such as an automobile wheel including a disk spider wheel body 11 carrying a multi-flange, drop center tire rim 12 including an intermediate generally axially outwardly extending and radially inwardly facing intermediate flange 13 which merges at a juncture shoulder 14 with a generally radially outwardly and axially outwardly extending terminal flange 15. A pneumatic tire 17 is adapted to be carried by the tire rim 12.

The wheel cover 10 is shown as a full disk type of cover comprising a sheet metal cover plate of a diameter to substantially entirely cover the outer side of the wheel including the wheel body 11 and the tire rim 12, although if preferred, the cover may comprise a circular radially outer cover portion with which the instant invention is primarily concerned, and a central hub cap type of cover separable relative thereto. In the present instance, the cover 10 includes a central crown portion 18 for overlying the wheel body and connected by an intermediate annular dished portion 19 with a radially outer circular marginal portion 20 which slopes generally radially and axially outwardly and is of an overall diameter to overlie the terminal flange 15. In the present instance the outer marginal cover portion 20 is of convex outer side cross-sectional contour with a corresponding inner side concave contour. It will be observed from FIGURE 2 that the outer marginal cover portion 20 is dimensioned to extend with its radially outer extremity adjacent to the tip of the terminal flange extremity inwardly past the rim shoulder 14 and with the portion thereof joining the bottom of the dished portion 19 disposed in generally diverging radially inwardly spaced telscoped relation to the axially outer portion of the intermediate flange 13.

Stiffening and reinforcing the outer marginal cover portion 20 and providing cover retaining means is an annular circularly continuous underturned flange 21 which joins the cover portion 20 on a turned finishing and reinforcing extremity juncture rib 22. The flange 21 is nested within the back of the cover portion 20 in reinforcing relation and is of a width to extend radially and axially inwardly past the rim shoulder 14. At its inner extremity, the underturned flange 21 is provided with cover retaining terminal means for retaining engagement with the intermediate flange 13. In the present instance, the cover retaining means comprise a circumferential series of generally axially inwardly extending cover retaining fingers 23 having short and stiff generally radially and axially outwardly extending terminal flange legs 24 that are engageable in edgewise thrusting retaining gripping relation with the inner face of the terminal flange 13. Normally the tips of the terminal legs 24 extend to a slightly greater diameter than the diameter of the axially outer portion of the intermediate flange 13 so that in the fully assembled relationship of the cover with the wheel, the retaining fingers 23 are resiliently radially inwardly deflected and tensioned to afford strong retaining thrust for the retaining terminals.

In order to stiffen the underturned flange 21 and make it a more effective reinforcement for the marginal cover portion 20 as well as to make it a more effective pry-off tool damage protecting means for the cover portion 20 as well as to facilitate coaction thereof with a pry-off tool, a plurality of concentric spaced circular corrugation-like reinforcing ribs and grooves are provided in the flange 21. These comprise generally axially outwardly projecting spaced ribs 25 alternating with generally axially inwardly projecting ribs 27. Between the ribs 27, the ribs 25 provide inwardly opening grooves. In the exemplary embodiment shown, there are four of the ribs 25 alternating with three of the ribs 27 and it will be observed that the ribs 25 bear against the inner face of the marginal cover portion 20 while the alternate ribs 27 are thereby maintained in spaced relation to the back of the cover portion 20.

One of the outwardly projecting circular ribs 25 is located adjacent to the inner extremity of the flange 21 and serves as a back-up and leverage shortening fulcrum for the retaining finger extensions 23 enhancing the resilient resistance to radial deflection thereof toward the opposing generally diverging portion of the dished cover portion 19. Such adjacent portion of the dished cover portion 19 is, however, sufficiently close to the radially inner sides of the retaining fingers 23 for bottoming thereagainst in cushioned relation in the event of unusual transverse forces on the cover such as may be occasioned by severe road shocks, thus avoiding undue diametrical displacement of the cover and thus possibly undue loosening of the retaining grip of the retaining finger terminals 24 of the retaining fingers generally diametrically opposite to the direction of lateral or diametrical shift responsive to the road shock or other force.

Outwardly adjacent to the innermost of the ribs 25, the inwardly projecting rib 27 is preferably cross-sectionally generally flat crowned and engageable as a centering and bottoming or axially inward stop shouldering engagement means for bottoming against the rim shoulder 14.

In applying the cover 10 to the outside of the wheel, a valve stem aperture 28 is registered with a valve stem 29 and the cover pressed axially inwardly to engage the retaining fingers with the intermediate flange 13 and until the bottoming rib 27 engages uniformly and in cover centering relation against the rim flange shoulder 14. In this fully assembled relationship of the cover to the wheel, the radially outer portion of the cover margin 20 and the underturned flange 21 overlie the terminal flange 15 in sufficiently spaced relation to accommodate wheel balancing weights therebehind, and also to provide a pry-off tool gap between the extremity of the terminal flange and the extremity of the cover.

For removing the cover 10 from the wheel, a pry-off tool P such as a screwdriver or the like is inserted into the gap between the cover marginal extremity and the terminal flange 15 and pry-off leverage applied. In this, the inwardly opening grooves defined by the underturned flange ribs 25 provide desirable pry-off tool receiving recesses while the radially inner sides of the respective ribs 27 afford respective shoulders against which the pry-off tool tip is engageable in substantially non-slip relationship for exerting pry-off leverage against the cover margin. Since there is a plurality of the alternating grooves 25 and 27 progressively inwardly from the edge of the cover, it will be appreciated that excellent progressively effective leverage points are provided for the pry-off tool as the axially outward pry-off displacement of the cover progresses. It will also be appreciated that since the pry-off leverag is exerted by the tip of the tool against the inwardly projecting ribs 27, any indentation that may occur as a result of either too vigorous application of pry-off force or because of an overly sharp pry-off tool tip, or otherwise, will not be transmitted to the outer cover marginal portion 20 and there will thus be freedom from marring thereof from this source.

In making the cover 10, sheet metal strip or plate of a preferably suitable drawing grade and gauge and comprising stainless steel, or brass or the like, is initially drawn into the form substantially as shown in FIGURE 3. In this condition the crown portion 18 is roughed out while the fairly deeply drawn intermediate portion 19 is partially completed and the outer marginal cover portion 20 extends axially outwardly and is joined by the flange portion 21 lying flat as in the original blank.

Figure 4:
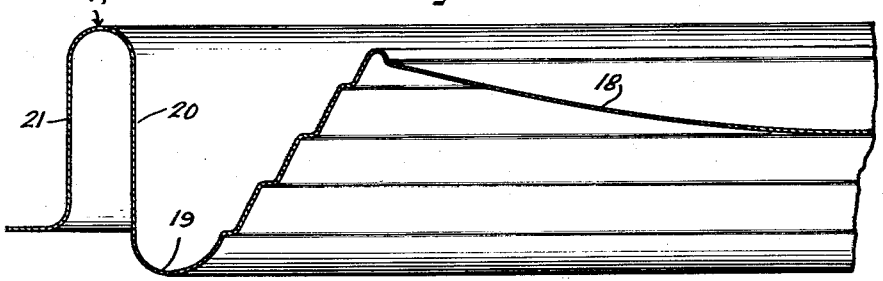
FIGURE 4 is a sectional detail view similar to FIGURE 3 but showing the blank after further working thereof.

Thereafter, the crown portion 18 is further worked in suitable dies to complete the preferred contours thereof. Also, the peripheral flange 21 is worked into substantially cylindrical axially inwardly extending form, as shown in FIGURE 4, to provide with the axially extending marginal portion 20 the radially outer leg of an axially outwardly extending rib R of which the cover portion 20 is the radially inner leg, and with the legs joined on a substantial radius to afford a substantial gap or space between the two legs of the rib. At this time, the extremity of the flange 21 while it is still in a flat radially extending condition is trimmed to provide the outline for the retaining fingers 23.

Figure 5:
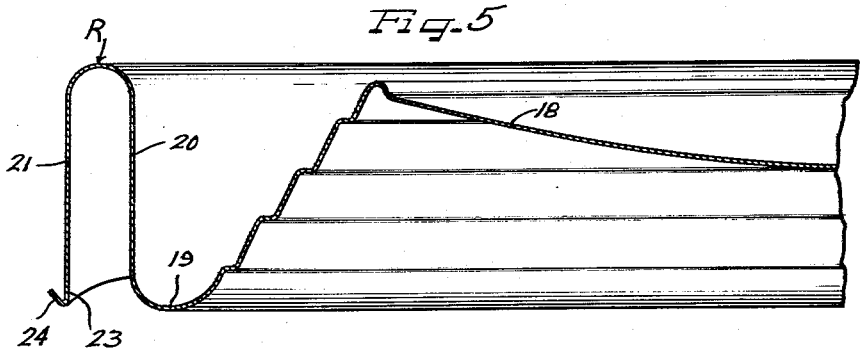
FIGURE 5 is a sectional detail view of the same blank after additional working thereof.

In the next step in drawing of the cover, the retaining finger extensions 23 are worked into axially inward extensions of the axially extending flange 21, and the retaining finger terminals 24 are bent up as shown in FIGURE 5.

The cover blank is now ready to be further worked to form the alternating ribs 25 and 27 in the cover marginal flange 21, which is accomplished in the rolling die assembly shown in FIGURE 6. This includes a generally cup-shaped rolling die member 30 with which is coactive a grooving roller 31. The die member 30 is rotatably supported in any suitable manner to withstand substantial transverse or radial thrust and for this purpose may be carried by a bed member 32 having an upwardly opening recess 33 within which the die member 30 is adapted to rotate upon suitable bearings or a spindle (not shown) while a cylindrical bearing wall or other suitable bearing arrangement 34 provided by the wall defining the recess 33 provides a lateral or diametrical support or stabilizer in association with a vertical cylindrical peripheral wall or surface 35 of the die member 30.

Peripherally upstanding on the die member 30 is a cylindrical rolling ring flange 37 of a length to extend upwardly within the marginal rib R of the partially preformed cover blank substantially throughout the length of the flange leg 21 with the intermediate dished portion 19 of the cover supported on the die member 30 within the recess defined by the flange ring 37. The inside diameter of the rolling ring flange 37 is of sufficiently larger diameter than the diameter of the cover rib leg portion 20, and the outside diameter of the rolling ring flange 37 is sufficiently smaller than the inside diameter of the outer cover rib flange leg 21, to afford ample clearance to enable rolling of the ribs 25 in the flange 21 by rolling ribs or ridges 38 on the roller die 31 coacting with complementary rolling die grooves 39 in the radially outer surface of the ring flange 37. During the rolling operation, that portion of the cover marginal flange 21 engaged by the rib forming roller 31 is pressed tightly against the outer periphery of the ring flange 37 as the ribs 25 are grooved thereinto. At the same time, the cover blank is shifted laterally so that the diametrically opposite side of the outer marginal cover flange 21, clears the ring flange 37. After the rib rolling operation has been completed entirely around the periphery of the cover blank, the rolling die member 31 is backed off and the cover blank removed from the die member 30 and another cover blank replaced in the die assembly for rolling of the ribs in the marginal flange thereof.

As the final step in shaping the cover, the cover blank is placed in die apparatus as shown in FIGURES 7 and 8, wherein the rib R is collapsed and turned radially outwardly into concealing relation to the cover retaining means and to provide the full enlarged diameter for the cover. To this end, the cover completing die structure of FIGURES 7 and 8 includes a lower die assembly having a bed plate or block 40 on which is mounted a central die structure 41 engageable within the crown portion 18 of the cover blank and having an outer marginal portion contoured complementary to the side wall of the cover crown and providing an annular concave forming surface 42 of a contour corresponding to the finished shape or contour of the intermediate portion 19 of the cover. About the forming surface 47 is a circular rabbet groove shoulder 43 for fixedly supporting the retaining fingers 23 of the cover blank.

Reciprocable relative to the lower die assembly between clearance and forming stroke positions is an upper coacting die assembly including a head structure 44 adapted to be carried by a die press ram and carrying a peripheral depending actuating cam structure 45 for reciprocably radially inwardly driving cam die supporting body members 47 in opposition to return springs 48 to position forming die segments 49 in operative relation to the forming die surface 42. It will be appreciated that in FIGURE 7 the relationship is shown wherein the segmental cam die assemblies have already been thrust into operative relation to the forming die surface 42 from a normally spring biased retracted position. In the operating position shown, all of the several segmental die members 49 coact to provide a substantially continuous forming surface 50 contoured to the shape which is desired in the turned out marginal flange structure of the cover.

Also carried by the reciprocable die structure 44 is a forming die member 51 of an incompressible but resiliently flowable elastic material such as rubber, either natural or synthetic. At its lower end, the forming ring die member 51 is shaped to fit in complementary relation within the dished cover portion 19 inside the inner leg flange 20 of the rib R of the cover blank. At its upper end, the rubber ring die 51 is secured adhesively or mechanically to a supporting compression ring member 52. A back-up and hold-down pad or member 53 is relatively reciprocably carried by the upper die structure 44 and has a cylindrical outside diameter relatively reciprocably slidably engaging the inside diameter of the rubber die ring 51.

After the upper die assembly components have attained the positions and relationships shown in FIGURE 7 in the course of a forming stroke, continuing downward movement of the head structure 44 applies compressive force to the rubber ring die member 51 through the supporting and pressure plate ring 52. Since the rubber die ring 51 is restrained against radially inward flowing by the back-up die ring member 53, deformation and flowing of the rubber ring die member is radially outwardly against the encircling cover rib R. As the compressive force builds up on the ring die member 51, the pressure thrust generated therein gradually collapses the rib R by working the axially inner end portion of the inner side leg 20 thereof into and against the die forming surface 42 while the rib R is bent laterally radially outwardly until the cover portion 20 collapses toward and against the flange portion 21 and the latter bends over onto the segmental die forming surface 50.

In the final increment of the rubber ring die compression stroke, a circular confining ring member 54 which rests upon the segment die members 49, limits radially outward flowing of the material of the rubber shaping ring die 51 to substantially the final diameter of the cover edge, and the compression ring 52 moves down between and in close peripheral relation to the confining radially spaced ring die members 53 and 54 so that the full pressure of the rubber forming die member 51 is concentrated against the underlying cover plate and more particularly the collapsed and outturned marginal flange structure to size the same. To assure proper application of sizing pressure against the turned over marginal flange structure of the cover, a depending annular pressure rib 55 intermediately on the rubber die opposing face of the pressure ring 52, drives into the upper portion of the rubber die ring generally in line with the intermediate dished cover portion 19 as best seen in FIGURE 8 which depicts the die assemblies at the completion of the forming stroke thereof. Thereafter, the upper die assembly is backed off which releases the compression die structure and disengages the actuating cam and segment die holding structure 45 for spring biased retraction of the cam die segments 47, 49 so that the completely formed cover can be removed from the die assembly.

It will be understood that modifications and variations may be effected without departing from the scope of the novel concepts of the present invention.

I claim as my invention:

1. In a method of making wheel covers, shaping a sheet metal blank into a cover form having a large axially outwardly extending circular rib providing a groove of substantial width opening axially inwardly, with the radially outer side of the rib provided by an axially inwardly extending flange in spaced opposition to a radially inner generally axially extending cover portion and having cover retaining terminal means thereon, working said flange between rolling dies one of which is inserted within said groove during the rolling and thereby shaping a plurality of axially spaced ribs in the flange, and thereafter collapsing said rib and bending said radially inner cover portion onto said ribs and all but an axially inner portion of said flange and radially outwardly into cover edge diameter-increasing and concealing relation overlying said terminal means.

2. In a method of making wheel covers, shaping a sheet metal blank into a cover form having a large axially outwardly extending circular rib providing a groove of substantial width opening axially inwardly, with the radially outer side of the rib provided by an axially inwardly extending flange in spaced opposition to a radially inner generally axially extending cover portion and having cover retaining terminal means thereon, corrugating said flange between corrugating dies one of which is inserted within said groove and thereby forming a plurality of spaced corrugations in the portion of said flange which opposed said radially inner generally axially extending cover portion, and thereafter collapsing said rib and bending said radially inner cover portion over the corrugations and onto all but an axially inner portion of said flange and extending the collapsed flange and radially inner cover portion and the corrugations into cover edge diameter-increasing and concealing relation overlying said terminal means.

3. In a method of making wheel covers, shaping a sheet metal blank into a cover form having a large axially outwardly extending circular rib providing a groove of substantial width opening axially inwardly, with the radially outer side of the rib provided by an axially inwardly extending flange in spaced opposition to a radially inner generally axially extending cover portion and having cover retaining terminal means thereon, working said flange between opposed dies one of which is inserted within said groove and thereby shaping reinforcing ribs in said flange in the portion thereof which opposes said radially inner generally axially extending cover portion, and thereafter collapsing said rib and bending said radially inner cover portion over said reinforcing ribs and onto all but an axially inner portion of said flange and extending the collapsed flange and radially inner cover portion and said reinforcing ribs into cover edge diameter-increasing and concealing relation overlying said terminal means.

References Cited in the file of this patent
UNITED STATES PATENTS

| | | |
|---|---|---|
| 2,146,587 | Merolle | Feb. 7, 1939 |
| 2,147,804 | Williams et al. | Feb. 21, 1939 |
| 2,304,582 | Lyon | Dec. 8, 1942 |
| 2,544,705 | Lyon | Mar. 13, 1951 |
| 2,597,010 | Lyon | May 20, 1952 |
| 2,624,637 | Lyon | Jan. 6, 1953 |
| 2,679,816 | Moore | June 1, 1954 |
| 2,707,449 | Lyon | May 3, 1955 |
| 2,713,517 | Lyon | July 19, 1955 |
| 2,825,961 | Woodward | Mar. 11, 1958 |
| 2,921,548 | Lyon | Jan. 19, 1960 |